(12) United States Patent
Englund et al.

(10) Patent No.: US 8,837,381 B2
(45) Date of Patent: Sep. 16, 2014

(54) USING AN UPLINK GRANT AS TRIGGER OF FIRST OR SECOND TYPE OF CQI REPORT

(75) Inventors: Eva Englund, Linköping (SE); Pål Frenger, Linköping (SE); Stefan Parkvall, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1113 days.

(21) Appl. No.: 12/532,360

(22) PCT Filed: Sep. 27, 2007

(86) PCT No.: PCT/SE2007/050683
§ 371 (c)(1),
(2), (4) Date: Sep. 21, 2009

(87) PCT Pub. No.: WO2008/115110
PCT Pub. Date: Sep. 25, 2008

(65) Prior Publication Data
US 2010/0113057 A1    May 6, 2010

(30) Foreign Application Priority Data

Mar. 19, 2007  (SE) ...................................... 0700701

(51) Int. Cl.
| | | |
|---|---|---|
| *H04W 4/00* | (2009.01) | |
| *H04L 12/26* | (2006.01) | |
| *H04L 1/00* | (2006.01) | |
| *H04W 72/14* | (2009.01) | |
| *H04W 48/08* | (2009.01) | |
| *H04W 24/00* | (2009.01) | |
| *H04W 88/02* | (2009.01) | |

(52) U.S. Cl.
CPC ............. *H04W 72/14* (2013.01); *H04L 1/0029* (2013.01); *H04L 1/0028* (2013.01); *H04W 24/00* (2013.01); *H04L 1/003* (2013.01); *H04L 1/0027* (2013.01); *H04L 1/0026* (2013.01); *H04W 88/02* (2013.01); *H04W 48/08* (2013.01)
USPC ........................................... 370/329; 370/252

(58) Field of Classification Search
CPC ..................................................... H04W 72/14
USPC ......................................................... 370/329
See application file for complete search history.

(56) References Cited

U.S. PATENT DOCUMENTS 7,158,504 B2 *  1/2007  Kadaba et al. ................. 370/348
7,957,360 B2 *  6/2011  Suzuki et al. .................. 370/341

(Continued)

FOREIGN PATENT DOCUMENTS

WO    WO 2005/072073 A2    8/2005
WO    WO 2006/086359 A2    8/2006

(Continued)

OTHER PUBLICATIONS

3GPP. 3rd Generation Partnership Project; Technical Specification Group Radio Access Network; High Speed Download Packet Access (HSDPA) enhancements (Release 6). 3GPP TR 25.899 V6.1.0 (Sep. 2004).

(Continued)

*Primary Examiner* — Gerald Smarth

(57) ABSTRACT

Channel state feedback is provided from a UE to a base station as a first, detailed or a second, less detailed type of channel state feedback information. Initially it is determined whether the UE has received an uplink grant from the base station or not. If the UE has received an uplink grant, a first type of channel state feedback information is transmitted to the base station on the granted resource. If, however, the UE has not received an uplink grant, a second type of channel state feedback information is transmitted to the base station. Different types of channel state feedback information enables a UE and an associated base station to use available resources more efficiently, when requesting for and delivering channel state feedback information.

31 Claims, 7 Drawing Sheets

(56) References Cited

U.S. PATENT DOCUMENTS

| | | | |
|---|---|---|---|
| 8,320,263 B2* | 11/2012 | Kurose et al. | 370/252 |
| 2003/0123396 A1* | 7/2003 | Seo et al. | 370/252 |
| 2004/0009767 A1 | 1/2004 | Lee et al. | |
| 2004/0198369 A1* | 10/2004 | Kwak et al. | 455/452.2 |
| 2004/0224712 A1* | 11/2004 | Tiedemann et al. | 455/518 |
| 2005/0129058 A1 | 6/2005 | Casaccia et al. | |
| 2005/0181811 A1 | 8/2005 | Magnusson et al. | |
| 2005/0220042 A1* | 10/2005 | Chang et al. | 370/278 |
| 2006/0171342 A1* | 8/2006 | Dateki | 370/311 |
| 2007/0070956 A1* | 3/2007 | Seki | 370/335 |
| 2007/0104177 A1* | 5/2007 | Hwang et al. | 370/348 |
| 2007/0165667 A1* | 7/2007 | Kadaba et al. | 370/465 |
| 2007/0183384 A1* | 8/2007 | Kwak et al. | 370/338 |
| 2007/0211656 A1* | 9/2007 | Kwak et al. | 370/319 |
| 2008/0032633 A1* | 2/2008 | Harrison et al. | 455/69 |
| 2008/0045255 A1* | 2/2008 | Revel et al. | 455/510 |
| 2008/0096488 A1* | 4/2008 | Cho et al. | 455/69 |
| 2008/0233964 A1* | 9/2008 | McCoy et al. | 455/450 |
| 2009/0316811 A1* | 12/2009 | Maeda et al. | 375/260 |

FOREIGN PATENT DOCUMENTS

| | | |
|---|---|---|
| WO | WO 2007/017731 A1 | 2/2007 |
| WO | WO 2007/023043 A1 | 3/2007 |

OTHER PUBLICATIONS

Ericsson. On CQI Reporting. 3GPP TSG RAN WG1 Meeting #50bis. No. R1-073746. Aug. 20, 2007.

Motorola. CQI Feedback for EUTRA. 3GPP TSG RAN WG1 Meeting #47bis. No. R1-070049. Jan. 15, 2007.

* cited by examiner

| CRT 1 | CQI A |
| CRT 2 | CQI B |
| CRT 3 | CQI C |
| . | . |
| . | . |
| . | . |
| CRT n | CQI X |

USING AN UPLINK GRANT AS TRIGGER OF FIRST OR SECOND TYPE OF CQI REPORT

TECHNICAL FIELD

The present invention relates generally to a method and arrangement for providing channel state feedback from a user equipment to a base station, and especially for making more efficient use of available resources when delivering channel state feedback.

BACKGROUND

Recent increase of mobile data usage and emergence of new applications such as gaming, mobile TV and streaming content have motivated the 3G Generation Partnership Project (3GPP) to work on the Long-Term Evolution (LTE) in order to ensure 3GPP's competitive edge over other, competitive cellular technologies.

LTE has been set aggressive performance requirements which rely on physical layer technologies, such as Orthogonal Frequency Division Multiplexing (OFDM) and Multiple-Input Multiple-Output (MIMO) systems to achieve these targets. Some main objectives of LTE are to minimize the system and User Equipment (UE) complexities, to allow flexible spectrum deployment in existing or new frequency spectrum, and to enable co-existence with other 3GPP Radio Access technologies (RATS).

In the LTE concept defined in the ongoing 3GPP work on standardization, the downlink will support fast channel dependent scheduling in both the time and frequency domains. A conventional downlink scheduling concept according to the prior art, may be described with stages 1:1-1:4, as illustrated in FIG. 1. A base station 100, which is referred to as an enhanced NodeB, or eNodeB in LTE, communicating with a UE 101, transmits reference signals to UE 101 in a first stage 1:1. The reference signals can be used by UE 101 to determine the present downlink channel quality. After having determined the downlink channel quality on the basis of the received reference signals, UE 101 sends one or more channel state feedback reports, which in this context typically are represented by Channel Quality Indication (CQI) reports, back to eNodeB 100 in a second stage 1:2. In eNodeB 100, the content of the one or more CQI reports can be retrieved and used by a scheduler (not shown), to perform resource allocation. UE 101 is informed of the resource allocation in a next stage 1:3, which is followed by transmission of downlink data over the allocated resource, as indicated with a final stage 1:4.

More on this issue can be found in "3G Evolution: HSPA and LTE for Mobile Broadband" E. Dahlman, S. Parkvall, J. Sköld, P, Beming, Academic Press, 2007.

In one embodiment proposed for the LTE, UEs will be capable of transmitting different types of CQI reports, such as full CQI reports, partial CQI reports, and differential CQI reports. In this context, full CQI reports are defined to cover the whole downlink transmission bandwidth scheduled for a UE. Different full CQI reports may, however, have different frequency resolution and may also be filtered and processed in different ways. In addition, different full CQI reports may be encoded in a variety of alternative ways. Partial CQI reports on the other hand cover only a part of the downlink transmission bandwidth. The covered part of a partial CQI report may be a set of contiguous, or a set of distributed resource blocks. Differential CQI reports may contain an encoded version of the update vector relative to a previous CQI report.

Furthermore, for CQI reports used together with different antenna configurations, such as SISO (Single-In Single-Out), MISO (Multiple-In Single-Out), SIMO (Single-In Multiple-Out), or MIMO (Multiple-In Multiple-Out), transmission could also be different. For MIMO, a CQI report may include information, such as e.g. transmission rank and/or pre-coding weights and/or other feedback parameters to be used by the eNodeB multiple antenna transmission scheme.

In one proposal for LTE presented in 3GPP, the UE may have a set of rules that specifies the conditions for CQI reports to be transmitted. According to this proposal, each CQI transmission trigger is associated with a specific type of CQI report in such a way that when a triggering criteria is true, the UE transmits a CQI report of an associated type. This procedure is similar to how compressed mode is parameterized in WCDMA. For WCDMA compressed mode, each UE is provided with a transmission gap pattern set (TGPS) consisting of transmission gap patterns (TGP), each defining a transmission gap of a configurable length that is used for a specific measurement purpose. CQI reports may be specified in a similar way, wherein each UE has a CQI reporting trigger set (CRTS), consisting of one or more CQI reporting triggers (CRT) that specify when a specific type of CQI report shall be transmitted.

FIG. 2 illustrates a table of a CQI trigger configuration for a UE, according to the prior art described above. The table comprises a plurality of CQI reporting triggers, CRT 1-n, configured for the UE. Each CRT is associated with one of the CQI report types, CQI A-X. When for example the trigger criteria specified by CRT 1 is true, a report type defined by CQI A will be transmitted from the UE to an eNodeB, as indicated in the table.

A CRT is typically expressed in terms of a logical expression which may involve one of, or a combination of, timers, events, and conditions, consisting of logical statements such as AND, OR, NOT, WHEN, and/or IF. A simple periodic CQI reporting trigger may consist of just a periodic timer and a rule that a certain CQI report shall be transmitted every time the timer expires. In another exemplified scenario, a simple event based CQI reporting trigger may configured to state that a certain type of CQI report shall be transmitted every time the triggering event, such as e.g. a handover event, occurs. A condition that could be included in the decision to transmit a certain CQI report or not, is e.g. if the downlink activity is above a specified threshold.

CQI reports may also be transmitted in different ways. A CQI report could be transmitted on a dedicated control channel resource, or on a scheduled resource provided on a shared channel. CQI reports may occur at known time instances and use a format known to the eNodeB, or the occurrence and format may be more dynamic. In the latter case the MAC header typically needs to include information about how the CQI report was transmitted, or else the eNodeB may have to perform blind detection on the CQI transmission format.

What types of CQI reports a UE shall use, and what criteria that will trigger them, are typically set-up by higher layer signaling, e.g. RRC signaling. In addition to configuring rules, defining when and how CQI reports are to be transmitted, the eNodeB also have the option to explicitly request for CQI reports on demand, typically by using RRC signaling.

The LTE uplink is based on single-carrier modulation and uses frequency, time and code division multiple access principles (FDMA, TDMA and CDMA). The LTE uplink consists of physical uplink control channels and data channels that are orthogonally frequency multiplexed. The single-carrier property of the LTE uplink makes it impossible for a UE to transmit on a physical control channel and a physical data channel in the same transmission-time-interval (TTI). Hence, if a UE is transmitting data on a physical data channel, the control information that must be sent in the same TTI must also be sent on the physical data channel. The UE will use the physical control channel to transmit control signaling only in the case when the UE has no data transmission, and, hence is not using the physical data channel.

There are at least three types of control signaling that may be sent in-band on the physical data channel in case the UE has uplink data to transmit, namely Hybrid ARQ (HARQ) ACK/NACK feedback for downlink data transmissions, scheduling requests and CQI reports.

The current assumption in 3GPP regarding the HARQ feedback and the scheduling request is that the HARQ will consist of one bit per MIMO stream, while the scheduling request might consist of just a single bit, indicating if a UE has data it wants to transmit or not.

The CQI reports on the other hand can be significantly larger. The amount of bits that can be spent on the CQI reporting may depend on a number of different criteria, such as: downlink transmission mode, e.g. SISO or MIMO; type of downlink traffic, e.g. VoIP or Web; downlink radio characteristics, e.g. coherence time and/or coherence bandwidth; current uplink load and/or current downlink activity. Furthermore, while the HARQ feedback and the scheduling request signaling are vital for the communication protocols to work at all, the CQI reports can be seen more as performance enhancing feature for the downlink.

The more uplink resources that are spent on CQI reports, the better link adaptation and scheduling decisions can be made, and the better the performance of the downlink may be achieved. As for signaling in general, there is, however, a trade-off between the amount of resources that are used for signaling and the amount of resources available for transmission of user plane data traffic. In current state-of-the-art it is known that it is beneficial to adapt the CQI reporting scheme to the conditions listed above.

A drawback with prior art CQI reporting mechanisms is, however, the lack of flexibility as to the use of available resources.

In order to fully support all possible CQI feedback schemes in all possible scenarios one would need to allocate an unreasonable amount of physical resources for uplink physical control signaling.

Even with a limited number of schemes applied, new feedback schemes are difficult to introduce, especially if they require that the uplink physical control channels need to be re-designed.

SUMMARY

The present invention aims to solve at least some of the problems mentioned above by providing a more efficient use of the uplink physical control channel.

The present invention relates to a method for triggering of a CQI reporting transmission from a UE. More specifically, the invention relates to a method in a user equipment, UE, for providing channel state feedback from the UE to a base station, using one of two different types of information, wherein the second type of information is less detailed than the first type.

Initially, it is determined whether the UE has received an uplink grant from the base station or not. If the UE has received an uplink grant, a first type of channel state feedback information is transmitted to the base station on the granted resource. If, however, the UE has not received an uplink grant, a second type of channel state feedback information is instead transmitted on a dedicated resource, or no channel state feedback information is transmitted at all. Hereby, the uplink physical control channel can be more efficiently dimensioned since only less detailed channel state feedback information in a format comprising very few bits is transmitted on this channel. Such information could for example comprise the selection of a specific antenna from an antenna array. More detailed channel state feedback information in a format comprising a large number of bits is transmitted on the granted resource. Such information could for example comprise frequency information on resource block level.

Thus, the invention limits the amount of overhead that must be allocated in a "dedicated" way for channel state feedback, while still allowing detailed feedback to be transmitted on a scheduled resource. Without the present invention these dedicated resources would need to be dimensioned to handle worst case CQI reporting demand, including possible MIMO requirements. Moreover, the reserved physical control channel resources would be wasted if the UE transmitted uplink data, since the uplink control signaling would then be transmitted using the scheduled resource instead and the reserved resources would not be used. By implementing the suggested mechanism, the uplink control channel can instead be configured to a minimum requirement.

According to one aspect of the invention, a UE receiving a grant when it has no uplink data to transmit, sends channel state feedback, such as a CQI report on the granted resource, even if no other condition that normally triggers a CQI report transmission is valid. As a consequence, the base station may interpret a scheduled uplink transmission that only consists of channel statement feedback, such as a CQI report, as an implicit signaling of an empty buffer status information message and/or as an acknowledgement on the uplink grant message that was transmitted in the downlink.

In addition, by introducing the proposed channel state feedback triggering procedure we can avoid sending unnecessary CQI reports, thereby saving control channel resources.

Another embodiment further comprises the step of only transmitting the channel state feedback information if the channel state feedback trigger criteria specified for the UE is found to be valid.

According to yet another embodiment, the less detailed type of channel state feedback information is periodically transmitted if the UE has no uplink grant, while the more detailed, first type of channel state feedback information is periodically transmitted if the UE does have an uplink grant.

According to another embodiment, two alternative ways of transmitting channel state feedback information of the first type is provided. According to this embodiment, both presence of an uplink grant and uplink data is considered. If the UE has uplink data and an uplink grant, a scheduled uplink transmission will consist of both channel state feedback information and uplink data. If, however, no uplink data is present, a scheduled uplink transmission will consist of only channel state feedback information. Scheduled uplink transmission according to any of the described embodiments may be utilized as a signaling of an empty buffer status information to the base station, or as an acknowledgement of an uplink grant that has been transmitted in the downlink.

According to yet another embodiment, the report to be used for transmission of the respective channel state feedback information may be dependant on the size of the received uplink grant, i.e. a base station may be able to select the size of a requested channel state feedback report by varying the uplink grant size, and the UE will be able to recognize the size as an indication as to which amount of information that is required by the base station. In addition, such a mechanism will offer an alternative to blind detection, since the base station knows what channel state feedback information format to expect. According to the suggested embodiment, the size of the uplink grant received at a UE is compared to a threshold, T1 channel state feedback information is prepared and transmitted in a report of a first type, having a size associated with T1 only if the uplink grant size exceeds T1. Such a comparison may also be gradually repeated for one or more thresholds, T2 . . . Tn, wherein T1>T2 . . . >Tn, and wherein each threshold is associated with a specific report type. The size of the uplink grant may be defined to represent an indication of the bandwidth, the modulation size, and/or the code rate associated with the uplink grant.

Alternatively, the remaining available energy for data transmission may be included on the uplink as a condition for transmission of the channel state feedback information.

According to another aspect, a UE for providing channel state feedback from the UE to a base station is presented, comprising a determining unit for determining whether the UE has received an uplink grant from the base station or not. The UE also comprises a transmitting unit for transmitting a first type of channel state feedback information to the base station on the granted resource if the UE has received an uplink grant, or a second type of channel state feedback information on a dedicated resource if no uplink grant has been received. Alternatively, no channel state feedback information at all is transmitted in the latter scenario, i.e. channel state feedback is only transmitted in response to a received uplink grant.

In another embodiment, the determining unit may be further adapted to determine whether relevant channel state feedback trigger criteria specified for said UE is valid or not. According to this embodiment, channel state feedback information is only transmitted if also the channel state feedback trigger criteria is found to be valid.

The channel state feedback information is typically transmitted in a report generated by a generating unit.

According to yet another embodiment, the generating unit may be adapted to periodically generate a second, less detailed report type if the UE has no uplink grant, while a second, more detailed report type is instead generated if the UE does have an uplink grant.

According to another, alternative embodiment, the determining unit may be adapted to compare the size of a dynamic uplink grant to a threshold, T1, and to generate a report associated with T1, if the size of the uplink grant exceeds T1. The determining unit may also be adapted to gradually repeat such a procedure for one or more thresholds as described above. If a report is required for all occasions, the smallest threshold may be set to 0.

In one embodiment, the determining unit may also be adapted to include remaining available energy for data transmission on the uplink as a condition for generating a channel state feedback report.

According to yet another aspect, a method in a base station, comprising a scheduler is provided for obtaining channel state feedback from a UE. According to one aspect of the invention, it is the presence of downlink data in the base station that triggers the scheduler to provide an uplink grant to the UE in order to receive the downlink channel state feedback required for link adaptation and/or channel dependent scheduling of downlink data to that UE on the granted resource. Thus, in case the base station needs channel state feedback information although there is no ongoing uplink transmission, an uplink grant can be sent from the base station to obtain the information. If the scheduler has determined that channel state feedback is required, an uplink grant is generated, and the uplink grant is provided to the UE in order to receive the channel state feedback on the granted resource.

According to another embodiment, it is also determined whether downlink data is present in the base station or not, and if this is the case, an uplink grant is generated and provided to the UE, in order to receive downlink channel state feedback on the granted resource.

According to yet another embodiment, the load of the uplink is considered, determining at the base station whether the uplink load is below a threshold, th or not. If this is the case, an uplink grant is generated and provided to the UE. Otherwise, the signaling required for providing channel state feedback information is avoided in favor of ongoing traffic.

An uplink grant may be provided to the UE for the purpose of receiving an uplink transmission on the granted resource, containing at least channel state feedback. The retrieved uplink transmission may then be used by the base station to estimate the uplink channel quality for link adaptation and/or channel dependent scheduling of uplink data from the UE. Hereby, the use of both uplink probing and non-scheduled CQI reports can be limited. The scheduler can thus place the channel state feedback reports on resources where it wants to probe the uplink channel. Alternatively, the uplink grant may be provided to the UE for the purpose of maintaining uplink synchronization.

According to yet another aspect, a base station, comprising a scheduler adapted to obtain channel state feedback from a UE is provided. The scheduler comprises a generating unit, adapted to determine whether channel state feedback is required or not, and, in case channel state feedback is required, the generating unit is further adapted to generate an uplink grant in order to receive channel state feedback from the UE on the granted resource. The uplink grant is then transmitted by a transmitting unit, and a receiving unit is adapted to receive channel state feedback in response to the transmitted uplink grant.

According to one alternative embodiment, the generating unit is adapted to provide an uplink grant to the UE in order to receive downlink channel state feedback required for link adaptation and/or channel dependent scheduling of downlink data to the UE on the granted resource if it is found that the base station has downlink data.

According to another embodiment, the generating unit is adapted to provide an uplink grant to the UE if it is found that the uplink load at the UE is below a specific threshold, th. The threshold is typically adapted such that uplink data from other UEs will not be negatively affected.

According to yet another embodiment, the generating unit may be adapted to provide a UE with an uplink grant for the purpose of receiving an uplink transmission on the granted resource, wherein the uplink transmission comprises at least channel state feedback. The scheduler may also be adapted to use the uplink transmission to estimate the uplink channel quality for link adaptation and/or channel dependent scheduling of uplink data from the UE.

The generating unit may be adapted to provide a UE with an uplink grant for the purpose of maintaining uplink synchronization. Alternatively, the generating unit may be adapted to generate an uplink grant of variable size, enabling the base station to request for channel state feedback information of a variable size.

BRIEF DESCRIPTION OF THE DRAWINGS

The present invention will now be described in more detail by means of exemplary embodiments and with reference to the accompanying drawings, in which.

DETAILED DESCRIPTION

Briefly described, the present invention involves a method, a user equipment and a base station adapted to handle channel state feedback reports in a more flexible way. More specifically, a channel state feedback procedure is provided which utilises the resources available for transmission of channel state feedback more efficiently. This is achieved by including uplink grant availability into the channel state feedback reporting triggers used for determining when and how to send channel state feedback from a UE, i.e. a channel state feedback reporting rule is set-up at the UE, specifying that the channel state feedback reporting will rely on whether a respective UE has obtained an uplink grant or not. Alternatively, uplink grant availability is configured to be the only trigger, specifying which type of channel state feedback report to transmit. By using an uplink grant, alone or in combination with other channel state feedback trigger criteria, a base station will also be able go get more out of using channel state feedback reports than what is possible with prior art solutions.

In the following exemplified embodiments, channel state feedback reports delivered from UEs will consequently be referred to as CQI reports and base stations will be referred to as enhanced LTE base stations, i.e. eNodeBs. Furthermore, the channel state feedback rules, specifying when to transmit a CQI report, which may be expressed in terms of a logical expression involving one or a combination of timers, events and/or conditions, will be referred to as CQI reporting triggers. It is, however, to be understood that the described embodiments may be applicable also for other comparable channel state feedback implementations.

Figures 1, 2:
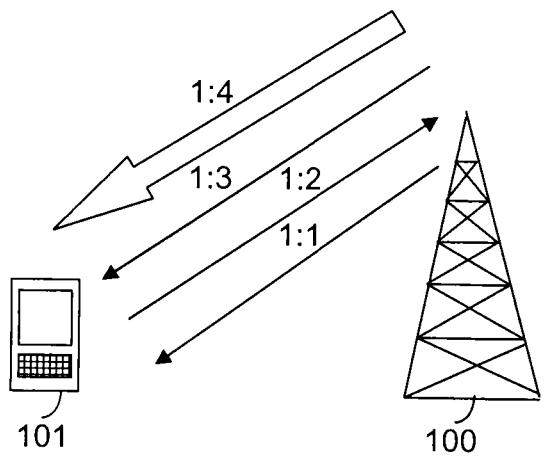
FIG. 1 is a basic overview of a signalling procedure between a user equipment and an eNodeB, according to the prior art.
FIG. 2 is a table indicating a configuration of CQI report triggers, according to the prior art.
Figure 3:
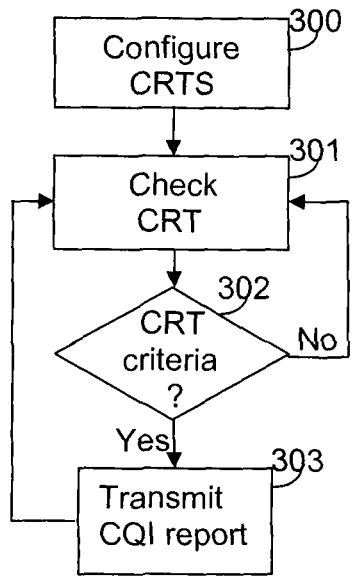
FIG. 3 is a flow chart illustrating a procedure for providing a CQI report from a user equipment to an eNodeB, according to the prior art.

FIG. 3 is a simplified flow chart illustrating a procedure for providing channel state feedback in the form of CQI reports from a UE to an eNodeB, according to the prior art. In a first step 300, the criteria for when and how to deliver different types of CQI reports, typically defined as specified above with reference to FIG. 2, configured as a CRTS by eNodeB, is delivered to and received by the UE. In a next step 301, a continuous checking procedure, for determining whether the CRT criteria specified by the CRTS is fulfilled, is initiated. If the criteria of a CRT is found to be fulfilled in a step 302, a CQI report of the respective type will be transmitted by the UE, as illustrated with a final step 303. If, however, the CRT criteria is not fulfilled, the checking procedure is repeated starting again with step 301. If there are a plurality of different types of CQI reports configured for the UE, the checking procedure will be repeated accordingly for each report type. Obviously, such a procedure for deciding when to transmit CQI reports leaves no room for flexibility as to the use of available resources or as to what information that can be retrieved from a CQI report.

Accurate channel quality knowledge at the eNodeB is mainly required when data is transmitted in the downlink. When there is no downlink data transmission taking place, there is, however, no or very small need for detailed CQI reports. Furthermore, when the UE is receiving data in the downlink, there will typically also be transmission activity in the uplink, and, thus, CQI reports should preferably be sent mainly when the UE is anyway transmitting in the uplink in response to downlink transmissions, as this will minimize the amount of semi-statically allocated CQI resources. For this reason, the CQI overhead can be reduced by defining two different CQI formats, wherein a first format using a larger number of bits, is used in situations when the UE would transmit data in the uplink anyway, while a second format using a smaller number of bits is used for CQI transmission only. Since the transmission structure is different for the two transmission cases, having different sizes for the two CQI reporting formats, such a procedure will not complicate the overall structure.

According to one embodiment, two different types of CQI reports, specified as a low-resolution type, i.e. a coarse type, and as a high-resolution type, i.e. a detailed type, respectively, are specified and the CQI reporting trigger criteria associated with these two CQI report types is set-up in such a way that if it is found that a UE has received an uplink grant from an eNodeB during a CRT check, the UE will transmit a detailed high-resolution CQI report using the granted resource, while a coarse low-resolution CQI report will be transmitted on the dedicated uplink physical control channel, if no uplink grant has been received. A method of managing CQI report delivery according to this embodiment will now be described in further detail with reference to FIG. 4a.

The first two steps 400, and 401 are executed in the same manner as for the prior art described above, referring to FIG. 3. In a subsequent step 403, however, it is determined if the UE has received an uplink grant or not. The presence of an uplink grant at the UE is unconditionally interpreted by the UE as an indication that a CQI report of a first type (type 1) is to be transmitted to the eNodeB on the granted resource. Such a transmission, which may comprise both data and channel state feedback information, is transmitted in a step 404. If, however, no uplink grant is present at the UE, a CQI report of a second type (type 2), comprising only channel state feedback information is to be transmitted on a dedicated resource, as indicated in another step 405. Alternatively, the type 2 CQI report alternative may be configured to instruct the UE to not transmit any CQI report at all, i.e. a CQI report is only transmitted to the eNodeB of an uplink grant is present at the UE.

According to another embodiment, which will be described with reference to FIG. 4b, also other trigger criteria, defined as CRT criteria, is considered when determining what type of CQI report to transmit from the UE. The CRT criteria may e.g. be based on the time since the last transmission of a CQI report took place and/or whether the present downlink activity exceeds a predefined threshold or not.

Figure 4A:
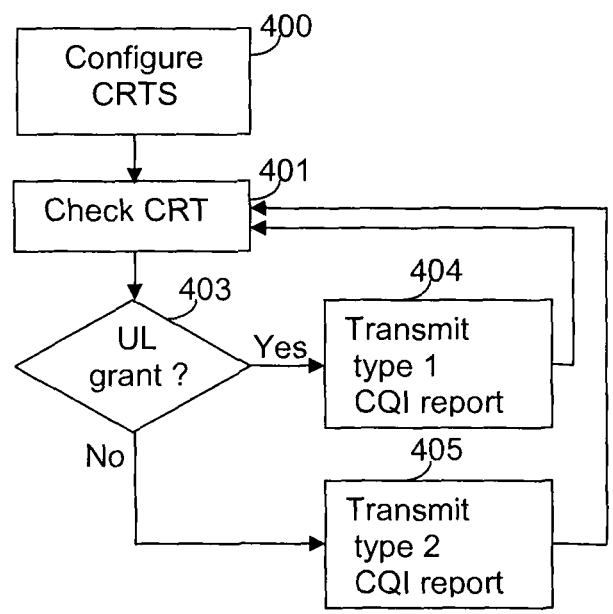
FIG. 4a is a flow chart illustrating a procedure for selecting a CQI report in user equipment, according to one embodiment.
Figure 4B:
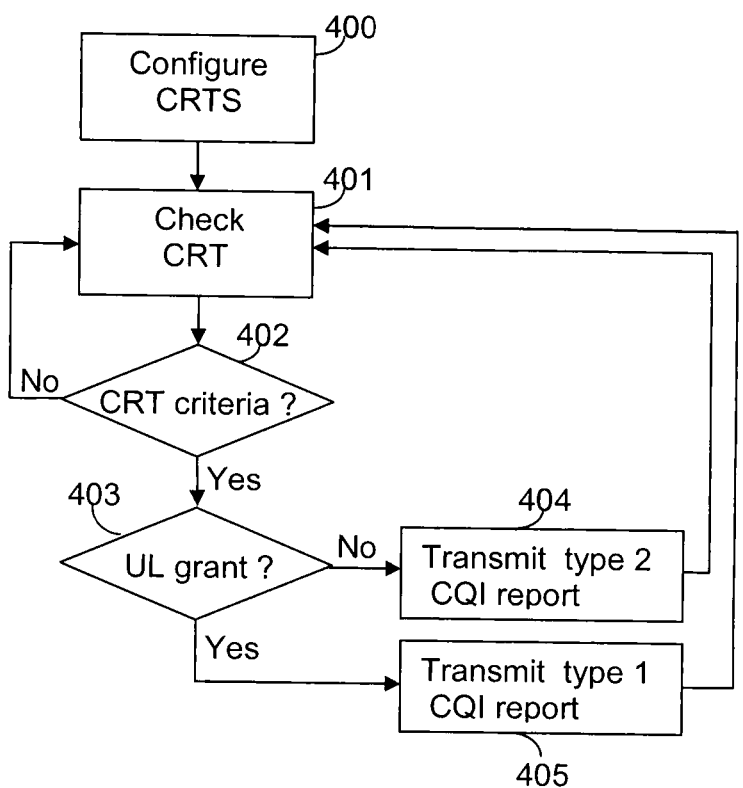
FIG. 4b is a flow chart illustrating a procedure for selecting a CQI report in a user equipment, according to another embodiment.

In FIG. 4b, steps 400 and 401 are equivalent to the ones already shown in FIGS. 3 and 4a. In a next step 402, however, the relevant CRT criteria is checked. If the CRT criteria is not valid, no CQI report is transmitted, and the checking procedure is restarted at step 401. If, on the other hand, the CRT criteria is found to be valid, it is determined if an uplink grant is present at the UE in a next step 403. If an uplink grant is not present, a coarse CQI report of type 2 is transmitted in a step 404, while a more detailed report of type 1 is instead transmitted in another step 405 if an uplink grant is present at the UE. Also in this scenario, the type 2 report alternative may be configured to instruct the UE to not transmit any CQI report at all.

Including uplink grant availability in the CQI reporting triggers has large implications on the practical usage of the CQI reports, since the CQI reports may be useful for a lot more purposes compared to what can be achieved with other state of the art solutions. A scheduler of an eNodeB may for example grant a UE a specific resource for the purpose of performing uplink channel estimation, regardless if it has received a scheduling request from the UE or not. If the UE responds to the grant by transmitting a CQI report on the granted resource, the scheduler will be provided with information about the uplink and downlink channel quality at the same time. Such a procedure may be used as a more effective alternative to channel sounding, where only a reference signal, carrying no information is transmitted from the UE.

In the situation when a UE has an uplink grant but no uplink data buffered for transmission, a CQI type 2 report received by the eNodeB, implicitly indicates to the eNodeB that the UE has no uplink data, and as a consequence for the eNodeB, requesting for empty buffer status information by the eNodeB will be superfluous, resulting in reduced signaling.

The described channel state feedback procedure can enable the scheduler of an eNodeB, which typically consists of an uplink scheduling function and a downlink scheduling function, to perform a trade-off between uplink and downlink capacity. If the downlink scheduling function requires a CQI report to be delivered, it can check with the uplink scheduling function if the corresponding UE has an uplink grant or not. If the UE already has an uplink grant, the scheduler can expect a CQI report to be transmitted on the granted resource. If, however, the UE does not have an uplink grant, the downlink scheduling function may request the uplink scheduling function to schedule the corresponding user in the near future, even if the corresponding user has not made any scheduling request. If the uplink load is low, the uplink scheduling function may choose to give the user a grant just for the sake of transmitting the CQI report that the downlink scheduling function requested. If, on the other hand, the present uplink load is high, i.e. higher than a specified threshold value, the uplink scheduling function may prioritize uplink data transmission from other users, and, thus, no resources will be used for CQI reporting as long as the uplink load remains high.

Channel state feedback may also be used to keep uplink users synchronized. The channel state feedback retrieved by the eNodeB in response to a received uplink grant may be used to control the load on the uplink synchronization channel, allowing the eNodeB to gain direct control of which users to keep in synchronized state. For example, in situations with low load, the scheduler can choose to keep the users synchronized for a relatively long time period in order to provide a quicker response time once new data arrives at the UE. Thus scheduled CQI reports may be used instead of synchronization probes on the uplink synchronization channel.

In situations when the UE is power limited on the uplink it may not be able to transmit a CQI report and data in the same TTI. For coverage reasons it would then be beneficial to have the option to turn off CQI reporting in cases where it has been found that the energy left for data transmission has fallen below a threshold. Therefore, also the remaining available energy for data transmission could be included in the CQI reporting trigger criteria. Since CQI reports and data transmissions are time multiplexed on the uplink, the removal of the CQI reporting from the TTI will give a power limited UE more time to transmit the data symbols, and hence the energy of the data part can be increased. The eNodeB may interpret an absence of a CQI report that should have been included according to one CTR as an indication that the power headroom of that UE is zero or below a minimum level. This option, thus can be used to avoid explicit signaling of the power headroom for severely power limited UEs.

It is also possible to combine the suggested channel state feedback procedure with a rule that provides uplink grants implicitly, e.g. by associating every downlink transmission with an implicitly granted uplink resource. An uplink resource grant may then be pre-configured in such a way that every UE that is scheduled in the downlink can derive an uplink grant for a future uplink transmission. This implicit uplink grant may e.g. be based on the position of the downlink resource allocation description on the downlink scheduling control channel. Such a rule could be beneficial since we know that when there is downlink data to transmit to a UE, transmission of HARQ feedback, TCP feedback, and CQI reports in the uplink will be required. In one alternative embodiment, a flag in the downlink assignment could be used to indicate if a downlink assignment is to be associated with an implicitly granted uplink resource or not.

Also the use of DRX/DTX, i.e. Discontinuous reception/Discontinuous transmission, in the UE may affect the procedure for delivery of CQI reports. A UE operating in a DRX/DTX mode may fail to produce an expected CQI report of a certain type since it is configured to not listen to the downlink reference symbols all of the time. Thus, a CQI triggering criteria may also include information regarding whether the UE is in a certain DRX/DTX mode or not. A UE in DRX mode may e.g. transmit a snapshot CQI report, based on a single observation of the downlink reference symbols, while a processed CQI report based on observations of downlink reference symbols from several TTIs may instead be transmitted if the UE is not in DRX mode.

A CQI reporting rule according to the claimed invention can be set-up stating that if a UE obtains an uplink grant when the UE has no uplink data to transmit, it sends channel state feedback, such as a CQI report on the granted resource, even if no other CRT criteria that normally triggers a CQI report transmission is valid. As a consequence, the eNodeB may interpret a scheduled uplink transmission that only consists of channel state feedback, such as a CQI report, as an implicit signaling of an empty buffer status information message, and as an acknowledgement of the uplink grant that was transmitted in the downlink.

Figure 5:
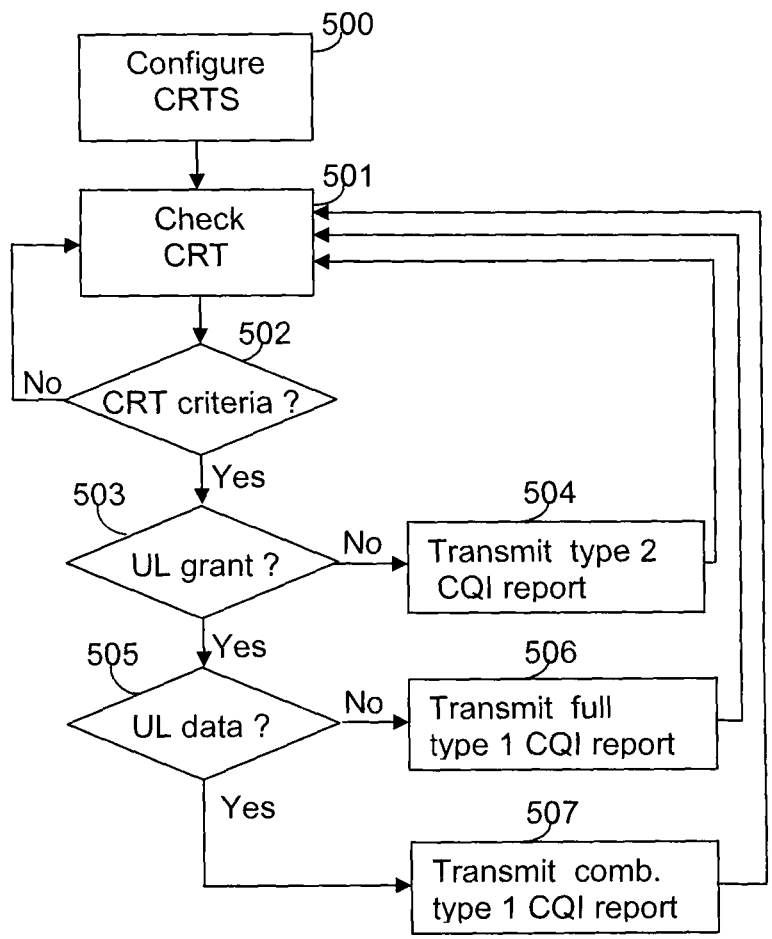
FIG. 5 is a flow chart illustrating a procedure for selecting a CQI report in a user equipment, according to yet another embodiment.

An alternative procedure for managing CQI report delivery in a UE according to another embodiment will now be described with reference to FIG. 5. According to this embodiment, also presence or absence of uplink data in the UE is considered and two different type 1 CQI reports, i.e. detailed reports are introduced, namely a full type 1 CQI report, comprising only channel state feedback information, and a combined type 1 CQI report, comprising a combination of uplink data and channel state feedback information.

In resemblance to the previous embodiment, also this embodiment starts with the configuring of a CRTS of a UE, as illustrated with a first step 500, followed by the initiation of a procedure for continuously checking the CRTs, specified by the CRTS in a next step 501, a checking of CRT criteria in a step 502, and of an uplink grant in a subsequent step 503. In resemblance to the previous embodiment, no uplink grant in the UE results in the transmission of a type 2 CQI report in a step 504. If, however, an uplink grant is found to be present in step 503, it is determined whether there is uplink data present in the UE in a next step 505. Depending on whether uplink data is present in the UE or not, a full or a combined CQI report of type 1 will be chosen for transmission of the channel state feedback information. Accordingly, no uplink data will result in the transmission of a full type 1 CQI report in a step 506. Such a detailed report may be configured to contain anything from e.g. 10% channel quality information, leaving remaining space empty, to 100% channel quality information. If instead uplink data is present, a combined type 1 CQI report will be transmitted, as illustrated with another step 507. Once a report has been delivered from the UE, the CRT checking procedure is repeated, starting with step 501. If the eNodeB provides the UE with an uplink grant according to the described embodiment it will, however, not know if it is to expect a type 1 CQI report or a type 2 CQI report since it does not know if the UE has uplink data or not. The eNodeB therefore will have to perform blind detection to determine whether a type 1 CQI report is a full or a combined version.

Figure 6:
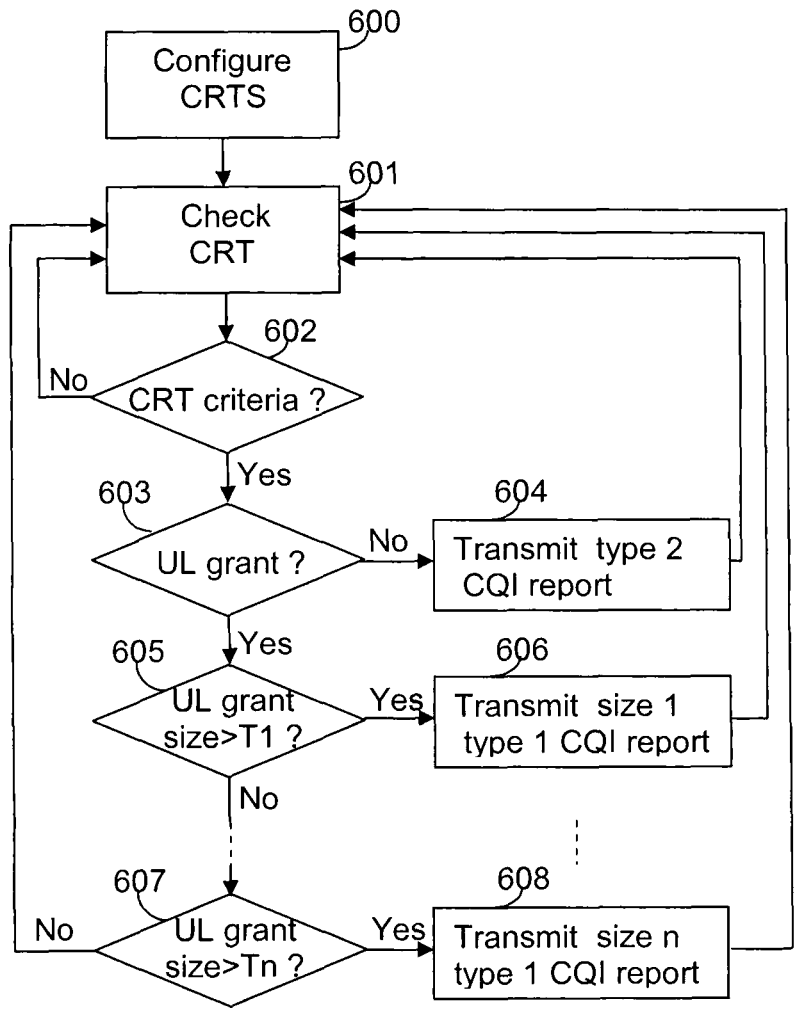
FIG. 6 is a flow chart illustrating a procedure for selecting a CQI report in a user equipment, according to another alternative embodiment.

The introduction of an uplink grant of a dynamic size may enable the eNodeB to implicitly know the transmission format of received channel quality information and, thus, to provide a powerful alternative to blind detection. The use of such a dynamic uplink grant will now be illustrated in yet another embodiment with reference to FIG. 6. Also in FIG. 6, the initial steps, namely Steps 600-604 are basically performing the same procedures as steps 500-504 in FIG. 5, wherein a CQI report of type 2 is transmitted on a dedicated channel in step 604, if no uplink grant is present at the UE. If an uplink grant is present at the UE, the size of the uplink grant will be considered in a step 605. In step 605, it is determined whether the size of that uplink grant exceeds a first threshold T1. If this is the case, a CQI report of type 1, having a specific size, size 1, associated with the comparison step, is transmitted to eNodeB in a step 606. If, however, the size of the uplink grant is smaller than T1, the procedure may be repeated, wherein the uplink grant is gradually compared to smaller thresholds, T2 . . . Tn, where T1>T2> . . . >Tn, until a match is found, i.e. the size of the uplink grant is bigger than a threshold, and a CQI report corresponding to the respective comparison step is transmitted. A final comparison is illustrated with a step 607, which results in either the transmission of a size n type 1 CQI report or no report at all. The smallest threshold, Tn may have a small amount or even be set to 0 if it is required that a CQI report is to be transmitted on each occasion when the CTR criteria has been found to be valid.

Figure 7:
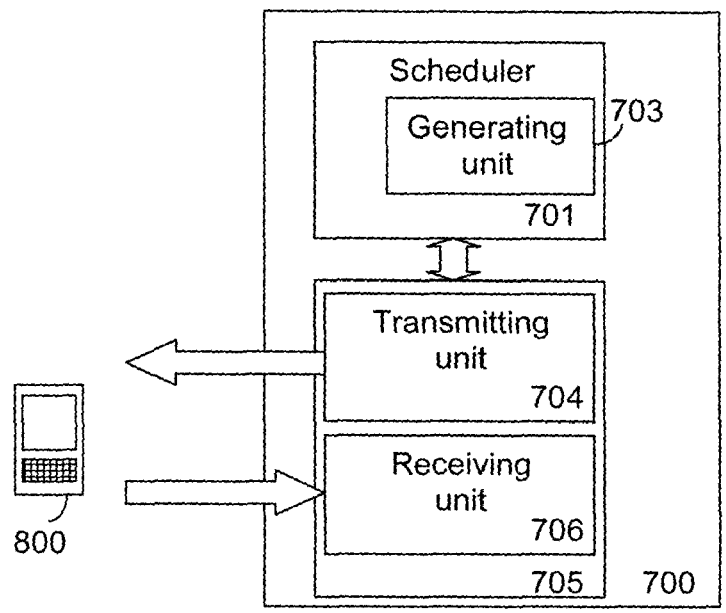
FIG. 7 is a block diagram, schematically illustrating an eNodeB, adapted to request for a CQI report, according to any of the described embodiments.

A simplified block diagram of a base station, exemplified as an eNodeB, adapted to operate in accordance with at least the embodiments described above, will now be described with reference to FIG. 7. It is to be understood that, for simplicity reasons, units which are not necessary for the understanding of the claimed invention have been omitted. It is also to be understood that all units mentioned in this document are to be interpreted as exemplified logical units, which may be implemented as single units of in combination with other units in any of various possible ways.

The eNodeB 700 comprises a scheduler 701, adapted to administrate scheduling between the eNodeB and one or more UEs, represented here by UE 800. The scheduler 701, which typically includes separate uplink and downlink scheduling functions (not shown), comprises a generating unit 703, adapted to determine whether channel state feedback information is required or not according to predetermined rules configured for the scheduler 701, and to generate an uplink grant to be transmitted to the UE 800 when it is found that channel state feedback information is required. An uplink grant generated by the scheduler 701 is transmitted to the respective UE via a transmitting unit 704 of a transceiver 705, and channel state feedback, which may be transmitted to the eNodeB 700 in response to the uplink grant, is received by a receiving unit 706 of the transceiver unit 705. Also rules for how to interpret the information retrieved from channel state feedback, or absence of expected channel state feedback, will be specified in the configuration of the scheduler.

Figure 8:
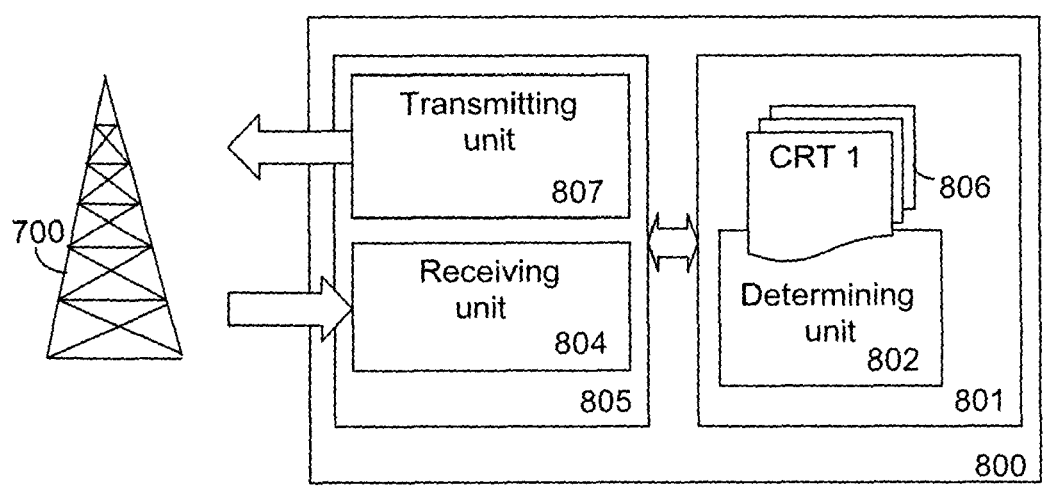
FIG. 8 is a block diagram, schematically illustrating a UE, adapted to provide a CQI report to a base station, according to any of the described embodiments.

Also a UE operating in accordance with at least the embodiment described above, will require modifications. A simplified block diagram of a UE, according to one embodiment, will now be described with reference to FIG. 8. Also in this figure, units and functions not necessary for the understanding of the claimed invention have been omitted. The UE 800 communicating with an eNodeB 700, comprises a generating unit 801 for generating a CQI report when the specified criteria is found to be valid, according to any of the embodiments described above. The generating unit 801 further comprises a determining unit 802, adapted to determine whether a respective CRT criteria is fulfilled or not, and, thus, whether a respective CQI report is to be transmitted or not. Obviously, the determining unit 802 is configured to determine whether an uplink grant has been received by the receiving unit 804 of a transceiver unit 805 of UE 800 and is present at the UE or not. The determining unit 802 also may determine whether the UE has uplink data to transmit or not. In addition, the determining unit may take the size of a received uplink grant into consideration when determining which version of channel state feedback information to transmit. The CQI reporting trigger criteria, specified for the UE in one or more CRTs 806, is stored within, or in association with the generating unit 801. Once the availability of an uplink grant, and, if applicable, the validity of the remaining CRT criteria, has been determined by the determining unit 802, a CQI report is generated by the generating unit 801. The chosen CQI report is then transmitted to the eNodeB 700 via a transmitting unit 807 of the transceiver unit 805.

Figure 9:
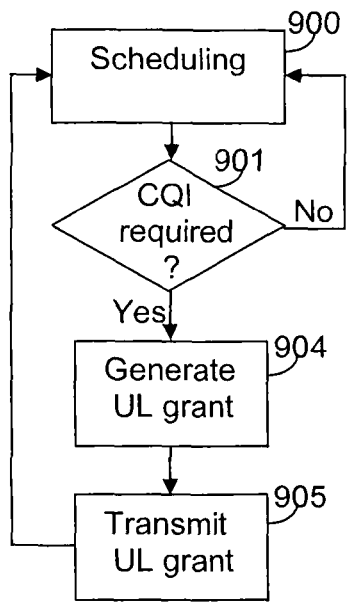
FIG. 9 is a flow chart illustrating a procedure for an eNodeB requesting a CQI report from a UE, according to one embodiment.

The operating steps of an eNodeB according to one embodiment will now be described with reference to FIG. 9, where scheduling is activated in a first step 900. When it is determined by the scheduler of eNodeB that a CQI report is required in a next step 901, the scheduler generates an uplink grant in a step 904, and transmits an uplink grant to the respective UE in a final step 905. The scheduling then proceeds accordingly, wherein the CQI report is awaited. In one alternative, the step 901 may be represented by checking the condition whether downlink data is present or not, i.e. if downlink data for the respective UE is present at the eNodeB, an uplink grant is generated in step 904 and transmitted in step 905, while no UL grant is transmitted otherwise.

Figure 10:
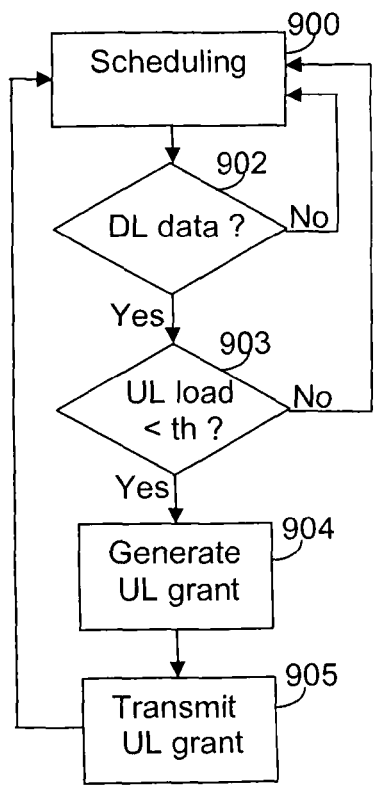
FIG. 10 is a flow chart illustrating a procedure for an eNodeB requesting for a CQI report from a UE, according to another embodiment.

An alternative embodiment of a configuration of the eNodeB is described with reference to FIG. 10, where the first step 900 and the final steps 904 and 905 are the same as described in the previous embodiment. In step 902, it is determined whether downlink data is present or not. If downlink data is present, the uplink load of the eNodeB is compared to a threshold, th in a next step 903, and if the uplink load is found to be below that threshold, an uplink grant is generated in step 904, and transmitted in step 905. If, however, the uplink load exceeds the threshold, the present load is considered to be too high to initiate channel state feedback transmission, and, thus, no uplink request is allowed to be transmitted at that occasion.

T0 conclude, with more efficient control channel handling, the total available resources of a network can be more efficiently utilized, resulting in an improved network capacity.

Even though the invention has been described in relation to the concept of LTE, it could be applied to any system that applies channel state feedback reporting, such as e.g. CQI reporting, and scheduled uplink, such as e.g. WCDMA with enhanced uplink. The invention is, thus, not limited to the disclosed embodiments, but is intended to cover various modifications within the scope of the appended claims.

What is claimed is:

1. A method in a user equipment (UE) of reporting channel state feedback from the UE to a base station, the method comprising the steps of:
   determining whether the UE has received an uplink grant from the base station;
   transmitting a first type of channel state feedback information to the base station on a granted resource upon determining that the UE has received an uplink grant, wherein the first type of channel state feedback information is a high-resolution type; and
   transmitting a second type of channel state feedback information on a dedicated resource upon determining that the UE has not received an uplink grant, wherein said second type of channel state feedback information is a low-resolution type, using a smaller number of bits than the first, high-resolution type.

2. The method according to claim 1, further comprising the step of determining whether a channel state feedback trigger criterion specified for said UE is valid and wherein the respective channel state feedback information is transmitted only if said channel state feedback trigger criterion is valid.

3. The method according to claim 1, wherein if the UE has no uplink grant the second, low-resolution type of channel state feedback information is periodically transmitted while the first, high-resolution type of channel state feedback information is periodically transmitted if the UE does have an uplink grant.

4. The method according to claim 1, further comprising the step of determining whether the UE has uplink data, and when the UE has uplink data and an uplink grant, a scheduled uplink transmission comprises both channel state feedback information and uplink data.

5. The method according to claim 1, further comprising the step of determining whether the UE has uplink data, and when the UE has an uplink grant but no uplink data, a scheduled uplink transmission comprises only channel state feedback information.

6. The method according to claim 5, wherein said scheduled uplink transmission is utilized as a signaling of an empty buffer status information to the base station.

7. The method according to claim 5, wherein said scheduled uplink transmission is utilized as an acknowledgement of the uplink grant that was transmitted in the downlink.

8. The method according to claim 1, wherein the type of report to be used for transmission of the respective channel state feedback information is dependent on the size of the received uplink grant.

9. The method according to claim 8, further comprising the step of comparing the size of said uplink grant to a threshold (T1) and wherein the channel state feedback information is transmitted in a report of a first type of a size associated with T1 if said uplink grant size exceeds T1.

10. The method according to claim 9, wherein if said size does not exceed T1, said comparison is gradually repeated for one or more thresholds, T2 . . . Tn, wherein T1>T2>Tn and wherein a match results in the transmission of a report of an associated size.

11. The method according to claim 1, wherein the size of the uplink grant is an indication of the bandwidth, the modulation size, and/or the code rate associated with the uplink grant.

12. The method according to claim 1, wherein remaining available energy for data transmission is included on the uplink as a condition for transmission of the channel state feedback information.

13. A user equipment (UE) for providing channel state feedback from the UE to a base station, the UE comprising:
   a determining unit configured to determine whether the UE has received an uplink grant from the base station; and
   a transmitting unit configured to transmit a first type of channel state feedback information to the base station on the granted resource when the UE has received an uplink grant, wherein the first type of channel state feedback information is a high-resolution type, and a second type of channel state feedback information on a dedicated resource when the UE has not received an uplink grant, wherein said second type of channel state feedback information is a low-resolution type, using a smaller number of bits than the first, high-resolution type.

14. The UE according to claim 13, wherein said determining unit is further configured to determine whether a relevant channel state feedback trigger criterion specified for said UE is valid, and wherein said transmitting unit is configured to only transmit channel state feedback information if the channel state feedback trigger criterion is valid.

15. The UE according to claim 13, wherein the transmitting unit is configured to transmit the channel state feedback information in a report generated by a generating unit.

16. The UE according to claim 15, wherein said generating unit is configured to periodically generate a second, less detailed report type in case the UE has no uplink grant and a second, more detailed report type in case the UE does have an uplink grant.

17. The UE according to claim 13, wherein said determining unit is configured to compare the size of said uplink grant to a threshold (T1) and wherein said generating unit is configured to generate a report associated with T1 if said size exceeds T1.

18. The UE according to claim 17, wherein if said size does not exceed T1, said determining unit is further configured to gradually repeat said comparison procedure for one or more additional thresholds, T2 . . . Tn, wherein T1>T2 . . . >Tn, and wherein said generating unit is configured to transmit a report of an associated size when the associated size exceeds one of the additional thresholds.

19. The UE according to claim 13, wherein said determining unit is configured to include remaining available energy for data transmission on the uplink as a condition for generating said report.

20. A method in a base station having a scheduler for obtaining channel state feedback information from a user equipment (UE) the method comprising the steps of:
   determining whether channel state feedback information is required;
   generating an uplink grant when channel state feedback information is required; and providing the uplink grant to the UE when the uplink grant is generated in order to receive the channel state feedback information on a granted resource;

receiving a first type of channel state feedback information on the granted resource when the uplink grant has been transmitted to the UE, wherein the first type of channel state feedback information is a high-resolution type; and receiving a second type of channel state feedback information on a dedicated resource when the uplink grant has not been transmitted to the UE, wherein the second type of channel state feedback information is a low-resolution type, using a smaller number of bits than the first, high-resolution type.

21. The method according to claim 20, wherein said determining step further comprises determining whether downlink data is present in the base station, and when downlink data is present, generating and providing the uplink grant to the UE in order to receive downlink channel state feedback information on the granted resource.

22. The method according to claim 21, wherein said determining step further comprises determining whether an uplink load is below a threshold (T1) and when the uplink load is below said threshold, generating and providing the uplink grant to the UE.

23. The method according to claim 20, wherein the uplink grant is provided to the UE for the purpose of receiving an uplink transmission on the granted resource containing at least channel state feedback information, and wherein the uplink transmission from the UE is used for estimating the uplink channel quality for link adaptation and/or channel dependent scheduling of uplink data from the UE.

24. The method according to claim 20, wherein an uplink grant is provided to the UE for the purpose of maintaining uplink synchronization.

25. The method according to claim 20, wherein the size of the uplink grant is variable.

26. A base station comprising a scheduler for obtaining channel state feedback information from a user equipment (UE) the base station comprising:

a generating unit configured to determine whether channel state feedback information is required, and to generate an uplink grant in order to receive channel state feedback from the UE on a granted resource upon determining that channel state feedback is required;

a transmitting unit configured to transmit the uplink grant to the UE when the uplink grant is generated by the generating unit; and a receiving unit configured to receive channel state feedback information, wherein the receiving unit is configured to receive a first type of channel state feedback information on the granted resource when the uplink grant has been transmitted to the UE, wherein the first type of channel state feedback information is a high-resolution type, and to receive a second type of channel state feedback information on a dedicated resource when the uplink grant has not been transmitted to the UE, wherein the second type of channel state feedback information is a low-resolution type, using a smaller number of bits than the first, high-resolution type.

27. The base station according to claim 26, wherein said generating unit is further configured to provide an uplink grant to the UE in order to receive downlink channel state feedback required for link adaptation and/or channel dependent scheduling of downlink data to the UE on the granted resource if the base station has downlink data.

28. The base station according to claim 27, wherein said generating unit is further configured to provide an uplink grant to the UE in case an uplink load is also below a threshold (T1) such that uplink data from other UEs will not be negatively affected.

29. The base station according to claim 27, wherein said generating unit is further configured to provide an uplink grant to the UE in order to receive an uplink transmission on the granted resource containing at least channel state feedback, and wherein said scheduler is configured to use the uplink transmission to estimate the uplink channel quality for link adaptation and/or channel dependent scheduling of uplink data from the UE.

30. The base station according to claim 27, wherein said generating unit is configured to provide a UE with an uplink grant for the purpose of maintaining uplink synchronization.

31. The base station according to claim 26, wherein said generating unit is configured to generate an uplink grant of variable size.

* * * * *

UNITED STATES PATENT AND TRADEMARK OFFICE
CERTIFICATE OF CORRECTION

PATENT NO. : 8,837,381 B2  
APPLICATION NO. : 12/532360  
DATED : September 16, 2014  
INVENTOR(S) : Englund et al.

It is certified that error appears in the above-identified patent and that said Letters Patent is hereby corrected as shown below:

Specification

In Column 7, Line 52, delete "go get" and insert -- to get --, therefor.

In Column 13, Line 8, delete "T0" and insert -- To --, therefor.

Signed and Sealed this
Twenty-third Day of February, 2016

Michelle K. Lee
*Director of the United States Patent and Trademark Office*